March 23, 1965   C. E. BERRY ETAL   3,174,922
ELECTRODE STRUCTURE
Original Filed Feb. 24, 1958

INVENTORS
CLIFFORD E. BERRY
LELAND G. COLE
BY
Christie Parker & Hale
ATTORNEYS.

United States Patent Office 3,174,922
Patented Mar. 23, 1965

3,174,922
ELECTRODE STRUCTURE
Clifford E. Berry, Altadena, and Leland G. Cole, Los Angeles, Calif., assignors to Consolidated Electrodynamics Corporation, Pasadena, Calif., a corporation of California
Original application Feb. 24, 1958, Ser. No. 717,038, now Patent No. 3,081,250, dated Mar. 12, 1963. Divided and this application June 21, 1962, Ser. No. 204,119
2 Claims. (Cl. 204—195)

This invention relates to an improved electrode structure, and is particularly useful in electrolytic cells, dielectric constant cells, and the like.

Cells currently finding use in commercial moisture analyzers are illustrative of one type of electrolytic cell, and the invention is described as applied to an electrolytic moisture analyzer. A typical cell comprises a pair of spaced conductive wire electrode coils wound with individual turns of one coil disposed between adjacent turns of the other coil, the coils being supported against the interior of an enclosing tube or housing. A film of a hygroscopic electrolyte, such as phosphorus pentoxide, is deposited on the coils and housing interior to bridge the space between adjacent turns of the two wire helixes.

One electrode coil is connected to the positive terminal of a direct current source of power, and the other coil is connected to the negative terminal of the power source. When the electrolyte is conductive, say upon absorption of moisture, an electrolytic cell exists between the alternately spaced turns of the electrode coils. In operation, therefore, as moisture is absorbed by the electrolyte from a fluid stream flowing past the coils, the electrolyte becomes conductive, current flows between the coils in the regions of conductivity and the water is electrolyzed to hydrogen and oxygen, which diffuses from the electrolyte as gas. The electrolyte is thereby continuously regenerated and the electrical energy consumed is an accurate measure of the moisture absorption in accordance with Faraday's laws.

Heretofore, cells of this type have been made by winding the electrode coils so they are held in the desired position by supporting coils or cores which were dissolved out after the two electrode coils were secured to the housing interior. This procedure has the disadvantage of requiring a time consuming dissolving operation to remove the supporting and spacing material for the electrode coils.

In the past, the electrolytic film was deposited from a liquid solution by coating and drying as many times as required to build up the desired amount of electrolyte. However, this procedure sometimes resulted in non-uniform deposition of electrolyte due to variations in wettability of the electrodes, and other difficulties inherent in depositing a material from a liquid solution. In addition, the coating and drying operation, particularly if repeated applications were required, resulted in increased manufacturing time.

In co-pending application Serial No. 717,038, filed February 24, 1958, now U.S. Patent No. 3,081,250, of which the present application is a division, there is described an improved electrode structure which eliminates the step of dissolving a supporting material from the coils, and in the preferred form also eliminates deposition of the electrolyte from a liquid, resulting in a further reduction of manufacturing time. Moreover, the sample flows between the housing and the peripheries of the coils, thereby substantially reducing the linear velocity of the sample without decreasing its throughput below that achieved with the prior electrolytic cells.

The apparatus of the aforesaid application contemplates an electrode structure which includes a core member with first and second electrical conductors on it, the two conductors being spaced from each other. A housing is disposed around the core and the conductors, and spaced from the core to leave a space for a sample between the core and the housing.

The present invention utilizes apparatus having an electrolyte support structure of a porous dielectric material in the form of a pair of hollow right circular cones joined at their apexes and having a common central axis to provide simultaneous moisture measurement and separation of the electrolysis products. Electrodes are formed on the inner surfaces of the cones and connected to D.C. potentials so that one cone is positive and the other negative. The electrolyte sorbs the material from the fluid stream, the D.C. potential initiates its electrolytic decomposition, and the decomposition products are collected at the electrodes as appropriate for their polarity.

These and other aspects of the invention will be more fully understood from the following detailed description taken in conjunction with the accompanying drawings in which:

FIG. 3 is a view taken on line 3—3 of FIG. 2.

Figure 1:
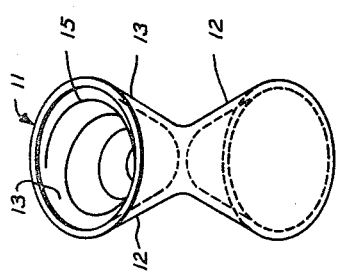
FIG. 1 is a perspective view of an electrode structure adapted to be used in electrolytic cell in which the decomposition products of the electrolysis are separately collected and separated from a fluid stream.

Referring to FIG. 1, a core member 11 made of a suitable porous dielectric material such as porcelain or sintered glass, is shaped in the form of a pair of hollow, right circular cones 12 joined at their apexes and having a common central axis. An electrolyte 13, such as phosphorus pentoxide, is disposed in the pores and on the surfaces of the core member so the core is impermeable to gases, and opposite surfaces of the core are bridged by the electrolyte. Other conventional electrolytes can, of course, be used. A first spiral electrode 15 is deposited on the inside of one cone portion of the core member in contact with the electrolyte, and a second spiral electrode 17 is deposited in the inside portion of the other cone portion in contact with the electrolyte. The electrolyte, as well as the electrodes, can be deposited from a vapor phase, as described in the aforesaid co-pending application, an appropriate mask (not shown) being used for the deposition of the electrodes.

Figure 2:
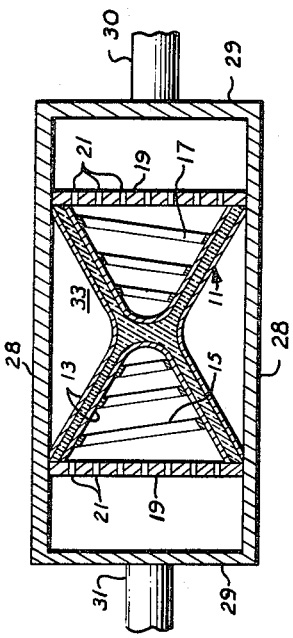
FIG. 2 is a schematic sectional view of a plurality of the electrode structures of FIG. 1 stacked to form an electrolytic cell.
Figure 2:
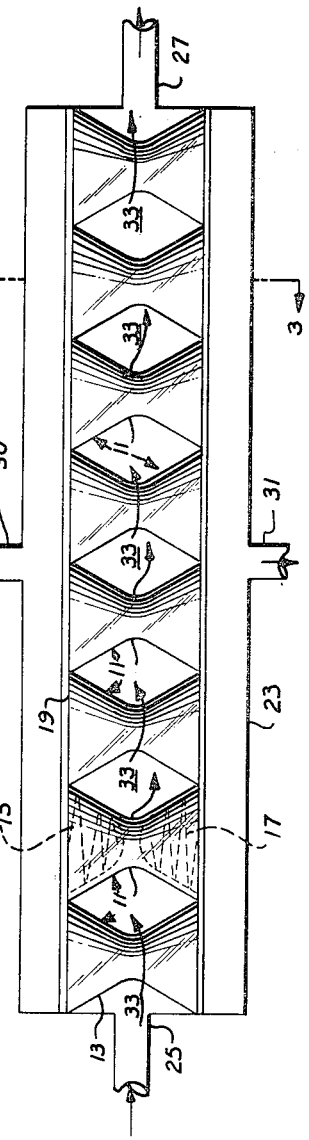

As shown in FIG. 2, a plurality of core members, each of which is generally X-shaped in cross section, are in an elongated stack with the central axes of the core members parallel to each other and perpendicular to the longitudinal axis of the elongated stack. The respective bases of the cone portions on each side of the stacked core members are covered by a separate elongated cover plate 19 which extends for the length of the stack. The cover plates have perforations 21 over the open area of each cone portion and serve a purpose described below. The stacked core members and cover plates are enclosed in an elongated housing 23 which has a fluid inlet 25 at one end and a fluid outlet 27 at its opposite end. Each cover plate extends for the entire length of the housing and is sealed against the end walls of the housing adjacent the inlet and outlet.

Referring to FIG. 3, the housing is of rectangular cross section having a pair of long side walls 28, and a pair of short side walls 29, which are parallel to the cover plates. The cover plates extend laterally so that each respective edge is sealed against the inside surface of the long side walls of the housing. A pair of lateral openings 30 and 31 in the short side walls serve as discharge openings for decomposition products. A fluid stream space 33 is formed between the exterior of the core members and the long side walls of the housing.

In the operation of the electrolytic cell shown in FIGS. 2 and 3, a fluid stream containing a material to be removed, such as water, flows in the inlet, through space 33 as indicated by arrows, and out the outlet. The material, say water, taken up by the electrolyte, is subjected to electrolysis due to a D.C. voltage source (not shown) connected by suitable means (not shown) to the respective electrodes on opposite sides of each core member. The oxygen formed by the electrolytic decomposition is released in the cone portions of the core members which contain the electrodes connected to the positive side of the D.C. source and the hydrogen formed by the electrolysis is connected in the other ends of the cores. Each of the decomposition gases passes through the perforation 21 of the side plates and out the respective lateral outlets in the housing. Thus, "wet" fluid enters the housing inlet, and "dry" fluid reaches the housing outlet. The decomposition products are continuously and separately removed from the fluid stream.

We claim:

1. Apparatus for removing from a fluid material susceptible to electrolytic decomposition, the apparatus comprising a porous core member approximately X-shaped in cross section, an electrolyte deposited in the pores of the core, the electrolyte having the characteristic of sorbing the material from the fluid, a first electrode on the core member and in contact with the electrolyte in a first V-shaped portion of the core cross section, a second electrode on the core member and in contact with the electrolyte in a second V-shaped portion of the core cross section, means for applying a voltage arcoss the electrodes to effect electrolytic decomposition of sorbed material, means for separately collecting an electrolytic decomposition product at each electrode, means for exposing the fluid to a third V-shaped portion of the core cross section, and means for keeping the fluid out of contact with the decomposition products.

2. Apparatus for removing from a fluid material susceptible to electrolytic decomposition, the apparatus comprising a porous core member approximately X-shaped in cross section, a housing disposed around the core member, an electrolyte deposited in the pores of the core, the electrolyte having the characteristic of sorbing the material from the fluid, a first electrode on the core member and in contact with the electrolyte in one V-shaped portion of the core cross section, a second electrode on the core member and in contact with the electrolyte in a V-shaped portion of the core cross section diametrically opposed from the portion in which the first electrode is in contact means for applying a voltage across the electrodes to effect electrolytic decomposition of sorbed material, means for separately collecting an electrolytic decomposition product at each electrode, and means for exposing the fluid to the other two V-shaped portions of the core cross section and for keeping the fluid out of contact with the decomposition products.

References Cited in the file of this patent

UNITED STATES PATENTS

| | | |
|---|---|---|
| 2,816,067 | Keidel | May 3, 1955 |
| 2,859,166 | Grigger | Nov. 4, 1958 |
| 2,882,214 | Summers et al. | Apr. 14, 1959 |
| 2,944,957 | Keidel | July 12, 1960 |
| 2,972,573 | Capacirni | Feb. 21, 1961 |
| 3,006,836 | Cole | Oct. 31, 1961 |
| 3,062,732 | Keidel | Nov. 6, 1962 |